Feb. 6, 1951 H. L. LESIGNE 2,540,896

TELEPHONE SYSTEM WITH PARTY LINES

Filed April 6, 1946 3 Sheets-Sheet 1

INVENTOR
HENRI LOUIS LESIGNE
By A. D. Adams
ATTORNEY

TELEPHONE SYSTEM WITH PARTY LINES

Filed April 6, 1946 3 Sheets-Sheet 2

INVENTOR
HENRI LOUIS LESIGNE
By A. D. Adams
ATTORNEY

TELEPHONE SYSTEM WITH PARTY LINES

Filed April 6, 1946 3 Sheets-Sheet 3

INVENTOR
HENRI LOUIS LESIGNE
By A. D. Adams
ATTORNEY

Patented Feb. 6, 1951

2,540,896

UNITED STATES PATENT OFFICE 2,540,896

TELEPHONE SYSTEM WITH PARTY LINES

Henri Louis Lesigne, Vanves, France, assignor to Compagnie Generale d'Electricite, Paris, France, a French corporation Application April 6, 1946, Serial No. 660,080
In France July 1, 1942

5 Claims. (Cl. 179—31)

This invention relates in general to telephone systems using party lines.

In known systems, the connected subscribers on a party line before using the line should ascertain whether the line is free or busy, by either a visible signal or an audible signal. Certain systems utilize for the operation of the switching members an individual battery at each subscriber's station.

The present invention is characterized by the registration of a call either by the operation of a relay having mechanical engagement actuated by the subscriber's magneto or by a control member controlled manually with mechanical engagement, such as a manual change-over switch or manually operated key.

The present invention permits getting rid of these inconveniences, that is to say, that each subscriber's station on a party line, initiates his call without preliminary checking up, and awaits his connection, while, for the purpose of economy and surety, the operation of the station no longer requires an individual battery at each station.

The present invention is further characterized by a circuit arrangement which permits the operation of an individual selector for each station, the stopping of this selector on the calling station, and the calling of the calling station, and also the establishment of communication with another subscriber's station on the party line, without utilizing a local voltage source, as a battery.

The present invention is also characterized by an arrangement and connection of the operating elements such that the particular pieces of equipment at each subscriber's station are interchangeable and without it being necessary to effect any mechanical modification of the parts or a change in their connections.

Other features will appear from the following description and the accompanying drawings, wherein.

Figure 2:
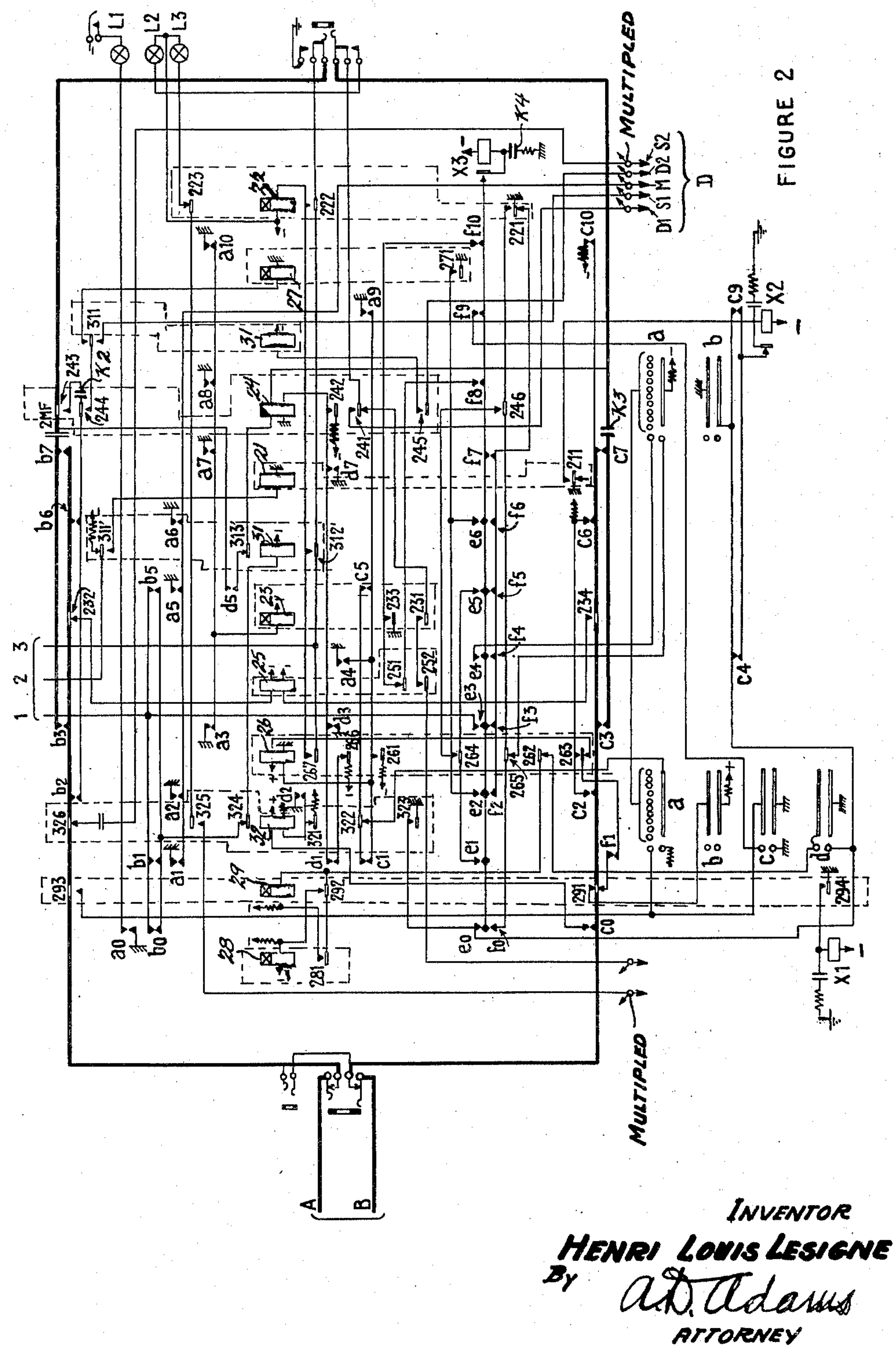
Fig. 2 shows the equipment of the party lines connected to a manual exchange or panel at the central office.

Consider first the case of a local call utilizing the equipment connected to a manual exchange, as shown in Fig. 2.

The subscriber who desires to make a call rings his magneto, which causes excitation of relay 2 at the subscriber's station (Fig. 1) over the circuit: the contact of the magneto, bottom contact of the switch hook, winding of relay 2, contact R2i', (lower contact of relay 2×), bottom contact of switch hook, magneto.

Relay 2 having a mechanical lock, remains closed.

Figure 1:
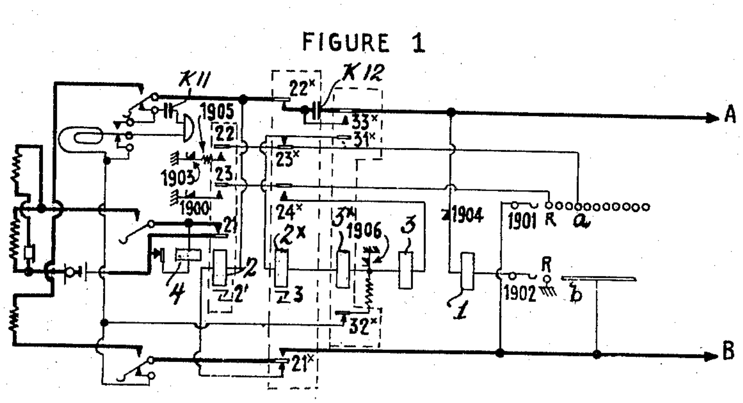
Fig. 1 shows the equipment of each subscriber's station on the party line.
Figure 4:
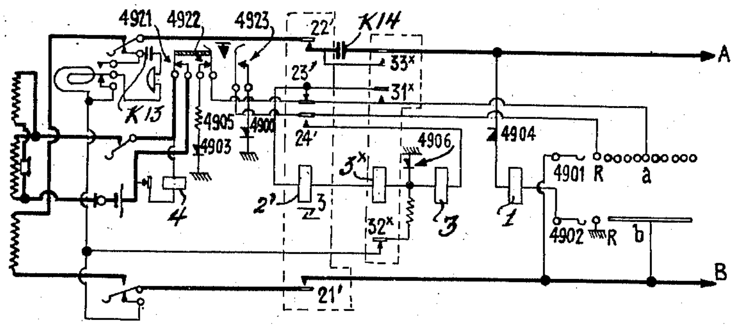
Fig. 4 shows a modification of Fig. 1, for the equipment of each subscriber's station in the case in which the call as made is registered by the engagement of an operating member controlled manually.

If the calling subscriber takes off his receiver, he hears the sound produced by a buzzer at the subscriber's station from which the short circuit is removed by contact R21 of relay 2 (Figs. 1 and 4).

The energization of relay 2 into operated position produces the call to the manual exchange over the circuit: ground, rectifier 1900 in the direction of passage of current, contact T23 of relay 2, rest contact of sector *a* of the individual selector, party line wire B (Fig. 2), contact Co, upper winding of relay 32, positive battery terminal.

Relay 32 is held closed over the circuit, ground, lower winding of relay 32, contact T321 of relay 32, resistance, negative battery terminal.

The calling lamp is lighted over the circuit: ground through the pilot relay, contact T325 of relay 32, contact R223 of relay 22, calling lamp, negative battery terminal.

The combiner rotary switch X3 rotates to reach its position 1 by action of the circuit: ground, contact T323 of relay 32, contact X3$e_0$, contact X3, actuating winding of rotary switch X3, negative battery terminal.

X3$e_0$ is the zero position or contact stud of the contact or bank *e* of the combiner X3. This combiner X3 is an auxiliary rotary switch which usually has eleven positions numbered from zero to ten inclusive, and its function is to complete various different combinations of contacts and of circuits, in a determined order. The combiner has an actuating winding to which reference character X3 is applied and has seven horizontal rows of contacts *a*, *b*, *c*, *d*, *e*, *f*, *g*, arranged in eleven vertical columns numbered from zero to ten, starting from the left, so that $a_{10}$ is the farthest right contact in the upper right corner of Fig. 2. These contacts are shown in the drawings as small cross-hatched squares.

The circuit of the lamp indicating that the line is free is interrupted at contact $a_0$.

Relay 29 is energized over the circuit: ground, contact T323 of relay 32, rest contacts of bank X1d, contact R262 of relay 26, actuating winding of relay 29, resistance, negative battery terminal. X1d is the bank d of rotary switch X1. The four banks a, b, c, d of rotary switch X1 are shown adjacent its magnet.

Rotary switch X1 is energized over the cricuit through contact T294 of relay 29.

The negative battery terminal is connected to the party line wire A over the circuit: negative battery terminal, resistance, rest contact of bank X1a, contact T293 of relay 29, wire A (Fig. 1), rectifier 1904 in the direction of passage of current, winding 1 of rotary switch sector b, rest contacts of rotary switch sector b, ground. Winding 1 is then energized.

Fig. 4 shows the modifications in the circuit of the subscriber's station of Fig. 1 when employing a member with mechanical engagement controlled manually, such as a change-over switch or manually operated key, which omits a relay.

The party line extends from the terminals A, B, on the right of Fig. 1 or Fig. 4, to the terminals A, B, at the central office shown in Fig. 2.

The wires 1, 2, 3 at the top of Fig. 2, lead to the operator's dial key, including its contacts and dial lamp.

In the upper right corner of Fig. 2, to the right of contact 223, the three lamps shown are, from top to bottom, the unoccupied lamp, the supervision lamp, and the calling lamp.

Then relay 28 is energized over the circuit: (Fig. 2) contact T292 of relay 29, and at contact T281 of relay 28 short circuits the winding of relay 29 which opens, rotary switch X1 then advances one step, the impulse on the party line wire A is terminated, which causes all the individual selectors to advance one step.

Relay 29 is again energized over the circuit through ground provided by bank X1d.

Through the circuit: contact T291, contact T293, a positive battery connection, and a ground, are connected respectively, to the wires B and A upon each impulse, which causes all the individual selectors to advance, the windings 1 (Fig. 1) being then looped on the line.

The calling unit has then been set into operation over the circuit: ground, contact a1, and the waiting signal is sent by contact T326 of relay 32.

The calling machine connections are shown by five arrows in the lower right corner of Fig. 2, and these connections are multipled. The calling machine is put into circuit over: ground, contact a, line M, and the waiting signal is sent by line 22, condenser, T326.

When the selector of the calling subscriber's station reaches the azimuth corresponding to the number of the subscriber's station, the relay 26 (Fig. 2) is held over the circuit: (Fig. 1), ground, rectifier 1903 in the direction of passage of current, resistance 1905, contact T22 of relay 2, contacts of the sector a, line wire B (Fig. 2), contact R291 of relay 29, contact f1, contact R263 of relay 26, upper winding of relay 26, positive battery terminal.

At contact T261, relay 26 is held and at contact R262 opens the actuating circuit of relays 29 and 28.

Through contact T266 of relay 26 and the contact d1, the relay 24 is energized and is then held by contact T242 of relay 24.

The relays 2' and 3' of the equipment of the called subscriber are energized over the circuit: negative battery terminal, resistance (Fig. 2), contact T263 of relay 26, contact f1, contact R291 of relay 29, wire B (Fig. 1), contact of sector a, contact R23', windings of relays 2' and 3' in series, rectifier 1906, ground.

Through contacts T21', T22' (Fig. 1), the connection of the subscriber's station to the line wires is completed over the circuit: through contact T31', the relay 3' holds relays 2' and 3'; through contact T33', the condenser of the wire A is short circuited, relay 2' has brought relay 2 to rest by a locking mechanical device, and is held, being mechanically engaged and locked.

If the subscriber has taken off his receiver, he then hears the waiting signal.

When the operator plugs in, relay 22 (Fig. 2) is energized over the circuit: ground, auxiliary contact of the jack, contact T267 of relay 26, winding of relay 22, negative battery terminal.

At its contact T222, relay 22 is held, and at its contact R223 opens the circuit of the calling lamp, rotary switch combiner X3 rotates to reach its position 2 by action of the circuit: ground, contact T221 of relay 22, contact T246 of relay 24, contact T264 of relay 26, contact e1, contact of combiner X3, actuating winding of combiner X3, negative battery terminal.

The actuating winding of relay 32 (Fig. 2) is short circuited by contact d2 of the combiner and opens. The relays 2' and 3' (Fig. 1) are held over the circuit: negative battery terminal, resistance, contact c2, line wire B.

At the subscriber's station (Fig. 1), the rectifier placed between ground and T23 permits the passage of the current, when on the rest position of the individual selector, the wire B is connected to a relay tied to positive battery (case of the calling of a subscriber's station). At the end of the communication, negative battery is placed on wire B, in the rest position of the selector. The preceding rectifier opposes itself to the passage of the current, the relay 3 is energized through the rectifier connected to the midpoint of the relays 3 and 3'.

The rectifier placed between ground and T22 permits the passage of the current at the time of the rotation of the selector, the wire B being connected to a relay tied to positive battery. This relay becomes energized when the selector finds itself on the position of a station being called.

The rectifier connected to the midpoint of the relays 3 and 3', being in the inverse sense, is opposed to the current in the position of circuit: ground, rectifier, relay 3', relay 2', R23'.

When the negative battery is placed on the line wire B, the role of the two preceding rectifiers is changed. The first rectifier opposes the passage of current, the second rectifier permits relays 2' and 3' to become energized.

During the advance of the individual selector, the relay 1 is energized by a positive battery impulse on line wire B, the return being effected through the rectifier in the sense of passing of current, the wire A and ground. The relays 2' and 3' cannot become energized, the rectifier connected to the midpoint of the relays 3 and 3' being then opposed to the passage of current.

At the time of energization of the relays 2' and 3' by a negative battery impulse on the wire B, the relay 1 remains at rest, the rectifier in series with it being then in inverse sense.

If the calling subscriber has hung up, calling current is sent by the following operation: (Fig. 2) relay 31 moves, being controlled by a cam, through contact T31, contact T244 of relay 24, contact b2, wire A (Fig. 1), contact T33', contact T22', the bell of the subscriber's station through a condenser, contact T21' of relay 2, line B (Fig. 2), contact C2, resistance, negative battery terminal.

The supervisory lamp flashes, being controlled by a fast moving cam; its circuit is completed through contact T241 of relay 24.

When the subscriber takes off his receiver, the relay 27 is closed on the release of relay 31 (Fig. 2) over a circuit similar to the preceding one, the loop being provided in the subscriber's station.

Through ground, contact T271 of relay 27 (Fig. 2), contact e2, the combiner X3 rotates to reach its position 3.

The relay 3' (Fig. 1) returns to rest position, but relay 2' remains in operated position, being mechanically held, the condenser is again inserted in the line wire A. The continuity of the line wires is completed through contacts d3 and c3 (Fig. 2), and the operator may then speak to the subscriber.

Through ground and contact a3, relay 23 is energized, and at its contacts T232 and T235 connects the supervisory relay 25 to the line wires (Fig. 2). Through ground contact d3, the A. C. relay 24 being short circuited, opens, relay 31 is interrupted by the cam at contact T242 of relay 24. Supervision is given by relay 25. If the subscriber hangs up, relay 25 is energized over the circuit: (Fig. 1) ground, rectifier, resistance, contact R32', switch hook, contact T21', wire B (Fig. 2), lower winding of relay 25, negative battery terminal.

The supervisory lamp is lighted over the circuit: ground, through the pilot relay (not shown), contact T252 of relay 25, contact T231 of relay 23, contact R241 of relay 24, contact of the jack, lamp, negative battery terminal. The pilot relay is connected to the two arrow-marked terminals immediately above X1 in the lower left corner of Fig. 2.

When the operator depresses the key of the dialing device, the ground of the auxiliary contact of the jack is connected to the wire 1 (3 and 1 being connected together) and by the contact d3 causes combiner X3 to advance to its position 4.

The winding of relay 26 is short circuited by the ground on contact a4 (Fig. 2).

By release of relay 26, the actuating circuits of the two relays 28 and 29 is re-established. Rotary switch X1 comes to rest as well as all the individual selectors.

Through C5 the rotary switch X2 also returns to its rest position if it is not already there.

When relay 26 and rotary switch X2 have returned to their rest positions, the rotary switch combiner X3 rotates to reach its position 5 through the circuit: ground, contact T221 of relay 22, contact R265 of relay 26, rest contacts of bank X2a, contact e4, and so on. X2a is the bank of rotary switch X2.

In position 5, the ground of wire 1 energizes relay 31' by b5 and contact R324. At contact R311', the negative battery on the wire 2 is removed, which permits the dial lamp to light.

At contact T311' of relay 31', the winding of relay 21 is connected to the dial switch and follows the dialing impulses (Fig. 2).

The dialing impulses cause rotary switch X2 to advance by virtue of the circuit: ground, contact T211 of relay 21, winding of rotary switch X2, negative battery terminal.

If the rotary switch X1 has had time to return to rest position, it commences to rotate again, the control ground connection on the actuating windings of relay 28 and relay 29 in order to pass position D0 being that given by the bank b of rotary switch X2. Relays 28 and 29 are then controlled by the ground connection of bank X1d.

Impulses are then sent through the line and cause the individual selectors to turn.

When rotary switch X1 reaches an azimuth corresponding to that which rotary switch X2 has assumed after reception of the dialing impulses, the relay 26 is closed over the circuit: negative battery terminal, resistance, bank X2a, bank X1a, contact R322 of relay 32, contact C5, lower winding of relay 26.

Relay 26 is held by contact T261 and at contact R262 opens the circuit which controls relays 28 and 29, thus limiting the number of impulses to the number which is registered on rotary switch X2.

The operator then lifts the dial key, relays 31' and 21 open. When the calling key is depressed, the relay 24 is held by the tip of the plug, wire A, contact d5, contact R313' of relay 31', winding of relay 24, wire B, sleeve of the plug, and is held by its lower winding. Rotary switch combiner X3 rotates to reach its position 6 by virtue of the circuit: (Fig. 2) ground, contact T221, of relay 22, contact T246 of relay 24, contact T264 of relay 26, contact e25, and so on.

The relays 2' and 3' (Fig. 1) of the called subscriber's station are energized over the circuit: (Fig. 2) negative battery terminal, resistance, contact o6, wire b (Fig. 1), contact of the sector a, contact R23' of relay 2', windings of relays 2' and 3' in series, rectifier 1906, ground, relay 2' connects the subscriber's station to the line at contact T22' of relay 2', and contact T21' and relay 3' short circuit the condenser of the wire A.

Relay 31 (Fig. 2) moves, controlled by the cam and over the circuit: contact T311 of relay 31, contact T244 of relay 24, contact b6, wire A, and then ringing current is sent.

The supervisory lamp flashes, controlled by a fast acting cam, its circuit being closed at contact T241 of relay 24.

When the called subscriber takes off his receiver, relay 27 is held by the circuit previously referred to, rotary switch combiner X3 rotates to reach its position 7, by virtue of the circuit, ground, contact T271 of relay 27, contact e6, and so on.

At B7 and C7, the continuity of the line wires is completed.

By contact b7, the winding of relay 24 is short circuited and the relay opened.

The winding of relay 23 is energized by contact a7, and connects the winding of relay 25 to the line, and prepares the supervisory circuit.

When the operator pulls out the plug, the relay 22 opens and the rotary switch combiner X3 rotates to reach its position 8 by virtue of the circuit: ground, contact R221 of relay 22, contact f7, and so on (Fig. 2).

Communication is then established.

If one of the subscribers then hangs up, relay 25 is energized as before, and rotary switch combiner X3 reaches its position 9 by virtue of the circuit: ground, contact T233 of relay 23, contact T251 of relay 25, contact f8, and so on, and relays 23 and 25 open.

At position 9, the relay 26 is short circuited by contact a9 and opens, and relays 28 and 29 move and cause the return to rest of the individual selectors and of rotary switch X1. Rotary switch X2 returns to rest through C9.

When rotary switch X1 has returned to rest position, the rotary switch combiner X3 rotates to reach its position 10 by virtue of the circuit: ground, rest contacts of bank X1c, contact f9, and so on.

Relay 233 which had opened, is again energized by contact a10, and rotary switch combiner X3 returns into position o through contact T233 of relay 23 (Fig. 2). During the passage through position 10, negative battery has been connected to the wire B by contact C10 and has caused the energization of the relays 3 (Fig. 1) of the stations over the circuit: negative battery through wire B, rest contact of sector a, contact T24' of relay 2', winding of relay 3, rectifier 1906, ground.

Relay 3 then causes the release of relay 2' (Fig. 1) by unlocking a mechanical device, and all the elements are freed.

If the communication desired is not a local communication, the operator will pass it, as usual, and supervision occurs as before, the rotary switch combiner X3 being at position 3 (Fig. 2).

On pulling out the plug, relay 22 opens, rotary switch combiner X3 rotates to reach its position 8 by virtue of the circuit: ground, contact R221 of relay 22, contacts f3 to f7, and so on.

Relay 23 is again energized by contact a8, and when the called subscriber hangs up, the relay 25 is energized, and rotary switch combiner X3 rotates to reach its position 9 by virtue of the circuit: ground, contact T233 of relay 23, contact T251 of relay 25, contact f8.

At the position 9, the rotary switch X1 and the rotary switch X2 return to rest position, as well as the individual selectors, as seen above, and at position 10, a releasing impulse is sent through the wire B.

When the operator desires to pass a call to a station on the party line, the operator plugs in, after being assured that the circuit of the lamp which indicates that the line is not busy, is closed, and the operator depresses the dialing key.

Relay 31' is energized over the circuit: ground, auxiliary contact of the jack, wire 3, then wire 1 connected by the dialing switch, contact bo, contact R324 of relay 32, winding of relay 31', negative battery terminal (Fig. 2).

Relay 31' on being energized removes the negative battery connection at contact R311' of the wire 2, which permits the lighting of the dial lamp, while relay 22 is energized over the circuit: ground, auxiliary contact of the jack, contact T312' of relay 31', winding of relay 22, negative battery terminal.

The rotary switch combiner X3 rotates to reach its position 1 by virtue of the circuit: ground, contact T221, contact fo, and so on, and relay 31' is held by contact b1.

At contact R223 of relay 22, the circuit of the call lamp is opened.

The dialing of the number has taken place as above explained. It is stopped by the energization of relay 26 over a circuit similar to the preceding one which causes the operation of relay 24, by virtue of the circuit: negative battery terminal, resistance, contact T266, of relay 26, contact d1, lower winding of relay 24, ground. The relay 24 is held by contact T242 of relay 24 (Fig. 2).

Rotary switch combiner X3 then rotates to reach its position 2 by virtue of the circuit; ground, contact T221 of relay 22, contact T246 of relay 24, contact T264 of relay 26, contact e1, and so on.

Relay 31', having its circuit opened at b1, becomes deenergized, and the dial lamp is extinguished.

Through contact a1, then contact a2, the ringing machine is set into operation.

Negative battery is connected to wire B through contact C2, which causes (Fig 1) the return to operated condition of relays 2' and 3', as above seen, while ringing current is sent through the wire A by virtue of the circuit: contact T311 of relay 31, contact T244 of relay 24, contact b2, relay 31 moving controlled by a cam by contact T245 of relay 24.

The operator observes the return of the call through contact T244, condenser, contact T243 of relay 24, wire A.

When the called subscriber answers, relay 27 is held by the circuit already described and by contact T271 of relay 27, the contact e2 causes the rotary switch combiner X3 to rotate to reach its position 3 (Fig. 2).

Through contacts b3, c3 the talking circuit is completed; the relay 24 having its winding short circuited by contact d3, opens, relay 23 is energized by contact a3, and connects relay 25 to the wires A and B, and prepares the supervisory circuits already referred to.

The release and the return to rest position of the various elements then takes place as explained above.

Figure 3:
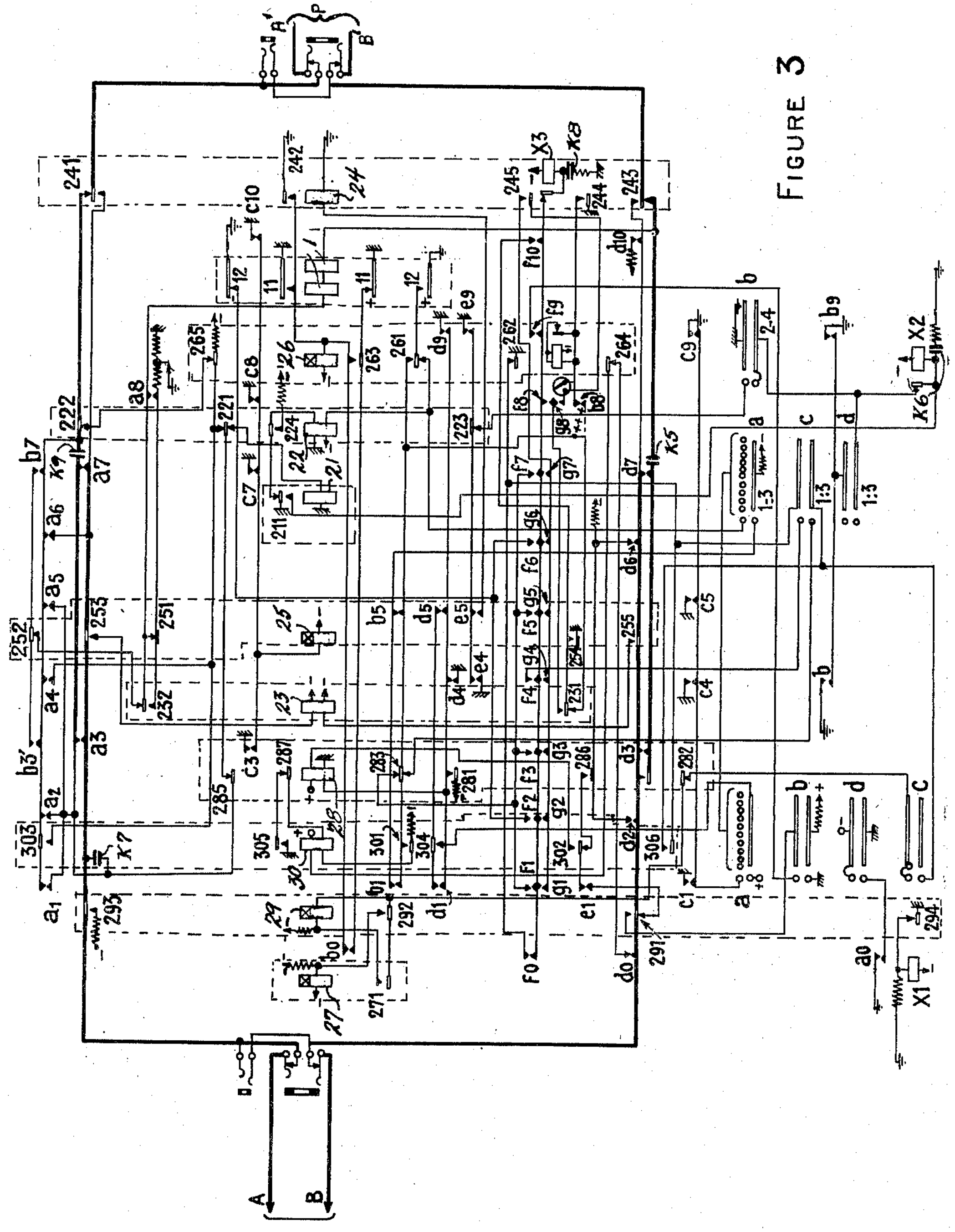
Fig. 3 shows the equipment of the party lines connected to a rural automatic exchange.

Referring to Fig. 3, there will now be considered the case where the communication utilizes equipment controlled by a rural automatic exchange. A single supplementary battery is necessary, its terminal connected to ground being either the positive terminal or the negative terminal, according to the particular circumstances.

The two wires shown on the right margin of Fig. 3, are the trunk line extending to a remote automatic exchange or to another remote rural center. In some rural automatic exchanges, the subscribers' stations are supplied by a local battery. The transmission of dialing impulses is effected by the operator of the center to which the calling subscriber is connected.

The number transmitted by the operator causes in one or more automatic offices and rural centers connected in a chain, different selections permitting the reaching of the called station.

Fig. 3 shows the equipment of a party line, connected to a rural automatic exchange, which equipment is placed in a rural center. On the left side of this figure, the line wires A and B are the party line to the subscribers' stations, as on Fig. 2, while the line P on the right side of Fig. 3 connects the equipment of the party line A, B, to an automatic exchange or to another distant rural center.

In the rural center where there is placed the equipment of Fig. 3, an operator can take the party line by the jack of the line P.

Assume that one of the subscribers' stations of the party line A, B (on the left margin of Fig. 3) is calling. It produces closing of the relay 30 (Fig. 3) by virtue of the circuit:

(Fig. 1) ground, rectifier 1900, contact T23 of relay 2, rest contact of sector a, wire B (Fig. 3), contact bo, contact R264 of relay 26, upper winding of relay 30, positive battery terminal. The negative pole of the battery is connected to ground over the circuit: ground, contact ao, rest contacts of bank X1b, and negative battery terminal. X1d is the bank of the rotary switch X1.

Relay 30 is held over the circuit: ground, contact T305 of relay 30, contact R287 of relay 28, lower winding of relay 30, resistance, negative battery terminal.

At contact T303 of relay 30, the negative battery terminal of the rural central exchange is applied to the wire A, producing a call to the rural automatic exchange (Fig. 3).

When the distributor of the rural center has concluded its operation, a negative battery voltage is applied to the wire B which causes it to energize in the negative position the polarized relay 1 (Fig. 3) connected to ground by contact R251 of relay 25.

Relay 26 is energized through contact T11 and negative battery, and rotary switch combiner X3 rotates to reach its position 1 by virtue of the circuit: ground, contact T262 of relay 26, contact *fo*, contact of combiner X3, winding of combiner X3, negative battery terminal.

Then, relay 29 is energized over the circuit: negative battery terminal, resistance, winding of relay 29, contact R282 of relay 28, rest contacts of bank X1*c*, contact T306 of relay 30, contact T262 of relay 26, ground (Fig. 3).

Through contact *c*1, the supplementary battery has its positive terminal connected to ground. By contact T293 of relay 29, the negative battery terminal is connected to wire A.

Relay 27 is energized through contact T292 of relay 29 and at its contact T271 short circuits the relay 29 which becomes de-energized and opens. The impulse of the line wire A will have freed the individual selectors at the *x* position of rest, while rotary switch X1 advances by one step, having been energized through contact T294 of relay 29 (Fig. 3).

Then relay 29 is again energized over the circuit: ground, bank X1*c*, and contact R282 of relay 28.

Through bank X1*d* of rotary switch X1, the negative terminal of the supplementary battery at the manual central office is connected to ground, the next impulse will apply the negative voltage of the supplementary battery (i. e. ground) to wire A, while wire B will be connected to the positive terminal of this battery by contact T291 of relay 29 at bank X1*b* of rotary switch X1.

The stopping on the calling subscriber will take place by energization of relay 28 over the following circuit:

Positive terminal of the supplementary battery (its negative terminal being connected to ground by bank X1*d*), upper winding of relay 28 (Fig. 3), contact T302 of relay 30, contact *e*1, contact R291, wire B (Fig. 1), contact of sector *a* in the azimuth of the station sought, contact T22 of relay 2, resistance 1905, rectifier 1903, ground.

Relay 28 is held by its contact T281 and interrupts at its contact R282 the control of the relays 29 and 27 (Fig. 3).

At contact T283, relay 28 prepares the circuit passing over the position 1 of rotary switch combiner X3.

At its contact T284, relay 28 completes the continuity of wire B.

At its contact R287 relay 28 opens the circuit of relay 30 which becomes de-energized and opens.

The negative battery voltage on the wire A towards the automatic exchange is cut off at contact R285 of relay 28.

The relays 2′ and 3′ (Fig. 1) are energized over the circuit: negative battery terminal, contact T286 of relay 28, contact R302 of relay 30, contact *e*1, contact R291 of relay 29, wire B, and so on.

Relay 2′ (Fig. 1) connects the subscriber's station to the line and thus permits the hearing of the waiting signal which is sent by the rural exchange on the line wire A if the subscriber has taken off his receiver, the waiting signal passing by contact *a*1, condenser, wire A of the party line (Fig. 1), T33′, T22′, the subscriber's station, T21′ (Fig. 3), T284, condenser, line wire B of the party line, toward the rural exchange.

In the arrangement shown in Fig. 4, for the equipment of each subscriber's station in the case in which the call is registered by the engagement of a member controlled manually, the rectifiers 4900, 4903, 4904, 4906, the resistance 4905, and the jacks 4901, 4902, correspond respectively to the elements 1900, 1903, 1904, 1906, 1905, 1901, 1902, of Fig. 1.

When the operator of the rural manual center plugs in, a positive battery voltage is applied on the wire B which brings the relay 1 into the positive position. Relay 26, which is retarded, remains held by contact T11, positive, and contact T263 of relay 26 (Fig. 3).

Through the circuit: ground, contact T12 positive, contact T261 of relay 26, contact T283 of relay 28, contact *f*1, and so on, the rotary switch combiner X3 rotates to reach its position 2.

At contact *a*2, the condenser of the wire A is short circuited, and by contact *d*2 a negative battery voltage is applied to the wire B toward the subscribers' stations, which causes the relays 2′ and 3′ of the subscriber's station to be held (Fig. 1) as described above, and the ringing current is sent by the rural center to the called subscriber.

When the called subscriber answers, providing the loop, the negative battery voltage applied to wire B by the contact *d*2 through the loop of the subscriber's station, energizes the relay stopping the call of the rural center.

The negative battery voltage is connected to the wire B, and positive battery voltage is applied to the wire A.

The polarized relay 1 thus comes into its negative position which causes the rotary switch combiner to advance into its position 3 by virtue of the circuit: contact T12, negative, contact *f*2, and so on (Fig. 3).

At contacts *a*3 and *d*3 the continuity of the line wires is completed.

Through contact *c*3, relay 25 is energized and at contacts T253 and T255 of relay 25, it connects the relay 23 to the party line wires A and B toward the subscribers' stations, while relay 25 also connects the polarized relay 1 to the party line wire A at contact T252 of relay 25, contact *b*3, and the interruption of the ground at contact R251 of relay 25.

In case the subscriber hangs up, the relay 23 is energized over the circuit: (Fig. 1) ground, rectifier, resistance, contact R32′ of relay 3′, hook switch, contact T21′ of relay 2′, line wire B (Fig. 3), contact T255 of relay 25, lower winding of relay 23, negative battery terminal.

At contact R232 of relay 23, the relay 1 (Fig. 3) is disconnected from the wire A and is connected at contact T232 of relay 23 to ground, the loop thus opened lights the supervisory lamp at the rural center.

Assume that local communication is to be handled. By depressing the dial key, the operator sends a negative battery voltage over the line B, relay 1 comes into the positive position.

Rotary switch combiner X3 rotates to reach its position 4 by virtue of the circuit: ground, contact T12 positive, contact T251 of relay 26, contact T283 of relay 28, contact f3, and so on.

When position 4 is reached, relay 25 has opened and the winding of relay 28 is short circuited by d4.

Through contact a4, a negative battery voltage is sent over the wire A, preventing the dial lamp from lighting. The circuit for return to the rest position of the rotary switch X2 is closed through: ground, contact b2, bank X2d of rotary switch X2, contact of rotary switch X2, actuating winding of rotary switch X2, negative battery terminal, then ground, contact e2, contact R223 of relay 22, rest contact of bank X2b, of rotary switch X2, the contact and actuating winding of rotary switch X2, negative battery terminal, then ground, and bank X2b of rotary switch X2 (Fig. 3).

The actuating circuit of relays 27 and 29 being again completed at contact R282 of relay 28, impulses are sent toward the subscribers' stations, thus causing the individual selectors to return to rest position, as well as rotary switch X1.

For the rotary switch X2, the brushes corresponding to the bank b are spaced by 90° with relation to the banks a, c, d.

Thus, on the first quarter turn, the banks a, c, d, are active, but not the bank b; on the second quarter turn, the bank b alone is active.

Rotary switch combiner X3 rotates to reach its position 5 by virtue of the circuit: ground, contact T12 positive, contact T261 of relay 26, contact R253, rest contact of bank X2c of rotary switch X2, contact f4, and so on. X2c is the bank c of rotary switch X2.

Relay 22 has its winding energized over the circuit; ground, contact T12 positive, contact T261 of relay 26, contact b5, rest contact of bank X2a of rotary switch X2, lower winding of relay 22, negative battery terminal. The application of negative battery voltage is interrupted from wire A at contact T221 of relay 22, the operator's dial lamp is then lighted indicating that the circuit is ready to receive the dialing impulses. Relay 21 has its winding connected to the wire A by virtue of the circuit: (Fig. 3) ground, winding of relay 21, contact T221 of relay 22, contact R285 of relay 28, contact a5, wire A, and then follows the dialing impulses. At the first impulse, it is energized by a negative battery voltage applied to the wire A. Relay 22 is held during the dialing impulses by virtue of the circuit: negative battery terminal, resistance, contact T224 of relay 22, the upper winding of relay 22, ground. Rotary switch X2 then advances by virtue of the connection to ground and contact T211 of relay 21.

If rotary switch X1 has rotated to reach its rest position, it then leaves its rest position, and relays 27 and 29 are controlled over the circuit: ground, contact T262 of relay 26, bank X2c of rotary switch X2, rest contacts of bank X1c of rotary switch X1, contact R282 of relay 28, and so on. The ground control is that of bank X1c of rotary switch X1 (Fig. 3).

Impulses are then sent toward the subscribers' stations as has been described above.

At the end of the train of impulses, the relay 21 becomes de-energized and opens, the winding of relay 22 is short circuited at contact R211 of relay 21 and also opens.

When rotary switch X1 has rotated to reach the azimuth corresponding to the number which has been dialed and sent, the winding of relay 28 is energized over the circuit: ground, lower winding of relay 28, contact d5, contact R304 of relay 30, bank X1a of rotary switch X1, bank X2a of rotary switch X2, resistance, negative battery terminal.

The control of relay 27 and of relay 29 is removed at contact R282 of relay 28, and relay 28 is held by its contact T281.

Rotary switch combiner X3 rotates to reach its position 6 by virtue of the circuit: ground, contact T12 negative, contact T261 of relay 26, contact T283 of relay 28, contact f5, and so on (Fig. 3).

After having dialed, the operator lifts the dial key and depresses the calling key, the effect of which is to send a positive battery impulse over the wire; B1 thus remains in positive position, and alternating current over the wire A is sent by the automatic exchange.

On the other hand, the connection to the line of the called station is effected by putting a negative battery voltage on the wire B by contact d6.

By contact a6 (shown at the top of Fig. 3 in the sixth vertical column from the left), the condenser of the wire A is short circuited. The stopping of the calling, on answering, is made in the same manner as above explained.

The relay 1 moves into negative position, a negative battery voltage being applied on the wire B through the rural center, as well as a ground on wire A. The ground placed by the rural center on the line wire A permits in position 7 of the rotary switch X3 for relay 1 to remain in shunt on the line until the operator unplugs.

Rotary switch combiner X3 rotates to reach its position 7 by virtue of the circuit: ground, contact T12 negative, contact f6, and so on.

At contacts a7 and d7, the continuity of the talking circuit is completed.

Through contact c7 of the combiner, the winding of relay 25 is energized and the winding of relay 23 is connected to the wires A and B at contacts T253 and T255 of relay 25 (Fig. 3).

Through contact T252 of relay 25, contact b7, the winding of relay 1 is connected to the wire A, while at contact T251 of relay 25, it is cut off from the local ground (Fig. 3).

Supervision takes place in a manner similar to that previously described.

When a local communication is being handled, the operator pulls out the plug, then relay 26 opens, and rotary switch combiner X3 rotates to reach its position 8 by virtue of the circuit: ground, contact R262 of relay 26, contact g7, and so on.

Through contact C8, the relay 25 remains energized, holding the relay 23 on the line.

Through contact a8, relay 1 is connected to ground, thus permitting its energization by the circuit from the automatic exchange.

Local communication is thus established.

If the operator wishes to pass another call, the relay 1 comes in a positive position, the relay 22 is energized over the circuit: ground, contact T12 positive, contact R261 of relay 26, winding of relay 22, negative battery terminal.

Through contact T222 of relay 22, contact R265 of relay 26, a negative battery voltage is applied to the wire A and signals to the operator when the line is busy (Fig. 3).

If a subscriber hangs up his receiver, the relay 23 is energized as before, and rotary switch combiner X3 rotates to reach its position 9 by virtue of the circuit: ground, contact T254 of relay 25, contact T231 of relay 23, contact f8, and so on.

If the local call is interrupted by a timing or chronometric relay, the triple negative connection is established. This chronometric relay operates over the circuit: ground, contact T254 of relay 25, contact T251 of relay 25, contact b8, contact of the chronometric relay, winding, negative battery. When the contact of the chronometric relay is closed, the rotary switch combiner X3 rotates to reach its position 9 by virtue of the circuit: ground, contact T254 of relay 25, contact R251 of relay 25, contact b8, contact, contacts g8 and f8, and so on (Fig. 3).

If the operation is such that the local call is not to be interrupted at the end of a definite time, the triple positive connection is made.

When the operator located at the test table of the rural center wishes to interrupt the call, the operator moves relay 1 into negative position and then into positive position. Relay 26 is then energized and is held, the chronometric relay is put into circuit through: ground, contact T12 positive, contact T261 of relay 26, contact b8, contact and winding of the chronometric relay, negative battery.

When the operator has closed the working contact, the rotary switch combiner X3 reaches position 9, and the call is interrupted.

At this position 9, the winding of relay 28 is short circuited by the contact d9, and in opening, the relay 28 re-establishes a circuit of the relays 27 and 29 which move, and cause rotary switch X1 and the individual selectors to come to rest.

Through contact b9, bank X2d, the rotary switch X2 comes to rest.

When rotary switch X1 has rotated to reach the rest position, the rotary switch combiner X3 rotates to reach its position 10 by virtue of the circuit: ground, rest contacts of bank X1b of rotary switch X1, contact f9, and so on (Fig. 3).

In the position 10, a negative battery voltage is sent over the wire B towards the subscribers' stations by contact d10, and thus produces, as above described, the release of the members belonging to the subscribers' stations.

Through contact c10, the winding of relay 25 is energized, and by virtue of the circuit: ground, contact T254 of relay 25, contact f10, and so on, causes rotary switch combiner X3 to advance to its position 0. All the parts are then freed.

If the call requested is not a local call, the operator passes it in usual manner, and the supervision operates as has been described above, the rotary switch combiner X3 being stopped at its position 3.

When the plug is pulled out, the relay 1 and the relay 26 are de-energized and opened, and the rotary switch combiner X3 rotates to reach its position 8 by virtue of the circuit: ground, contact R262 of relay 26, contacts g3 to g7, and so on.

At position 8, the winding of relay 25 is energized and the position 8 is freed over the circuit: ground, contact T254 of relay 25, contact T231 of relay 23, contact f8, the winding of relay 23 being energized when a subscriber has hung up his receiver.

Upon reaching position 9, the rotary switches come to rest in the same manner as has been above described, and upon reaching position 10, release takes place.

If the operator desires to pass a call to a subscriber's station on the party line, the operator plugs in, and on depressing the dialing key, sends a positive battery impulse over the line B, the effect of which is to cause relay 1 to come into the positive position. Relay 26 is energized over the circuit: ground, contact T11 positive, contact $b_0$, winding of relay 26, negative battery (Fig. 3).

Rotary switch combiner X3 rotates to reach its position 1 by virtue of the circuit: ground, contact T262 of relay 26, contact fo, and so on.

At this position 1, the winding of relay 22 is energized over the circuit: ground, contact T12 positive, contact T261 of relay 26, contact b1, rest contacts of bank X2a of rotary switch X2, lower winding of relay 22, negative battery, and at contact R221 of relay 22 interrupts the negative battery connection of wire A.

Through contacts T221 of relay 22 and R285 of relay 28, contact a1, the winding of relay 21 is connected to the wire A and follows the dialing impulses. These dialing impulses are produced as above explained.

The sending of the dialing impulses to the stations, and the stopping, are effected as before described. The winding of relay 28 is then energized through contact d1. The succession of operating steps is identical with that above described.

If the tester wishes to make tests, the tester calls a subscriber as above, and then the rotary switch combiner X3 having arrived at its position 3, the tester dials the number 11 on his dial, which causes rotary switch X2 to advance to the position of rest of sector b shifted through 90° with respect to the others. Relay 22 becomes de-energized and opens at the end of the train of dialing impulses.

To describe the operation in more detail, the rotary switch combiner X3 rotates to reach its position 3 by virtue of the circuit: ground, T12 positive, contact T261 of relay 26, contact T263 of relay 26, contact f3, and so on.

Upon reaching position 4, the winding of relay 28 is short circuited through ground, and contact d4, and releases. Relay 22 returns to rest position at the end of the train of dialing impulses.

Rotary switch X2 returns to rest position by virtue of the circuit: ground, contact b4, bank d, then ground contact c4, contact R223 of relay 22, on the contact $b_0$, then ground and bank b.

Rotary switch combiner X3 rotates to reach its position 5 by virtue of the circuit: ground, contact T12 positive, contact T261 of relay 26, contact R283 of relay 28, contact Co of rotary switch X2, contact f4, and so on.

The winding of relay 24 is energized over the circuit: ground, winding of relay 24, contact c5, contact R223 of relay 22, rest contacts of bank X2b of rotary switch X2, contact and winding of rotary switch X2, negative battery terminal (Fig. 3).

Upon being energized, relay 24 holds relay 26 through its contact T242, but opens 1 of wire B at contact R243 of relay 24, and at contacts T241 and T242 of relay 24, it maintains the metallic continuity of the line wires.

The chronometric relay set in operation by contact T244 of relay 24 permits of making tests, during the time that it takes to close its working contact. When the working contact is established, the rotary switch combiner X3 rotates to reach its position 6 by virtue of the circuit: ground, contact T244 of relay 24, contact of the chronometric relay, contact T245 of relay 24, contact g5, and so on.

The energizing circuit of relay 24 is interrupted at contact e5, and relay 24 becomes de-energized and opens, being followed by relay 26.

Rotary switch combiner X3 rotates to reach its position 8 by virtue of the circuit: ground, contact R262 of relay 26, contacts g6 and g7, and so on (Fig. 3).

When the subscriber hangs up his receiver, the position 8 is passed, the relay 25 is energized, and the receiver having been hung up, relay 23 is operated over the circuit: ground, contact T254 of relay 25, contact T231 of relay 23, contact f8, and so on.

At position 9, the rotary switch X2 passes the position of rest of the sector b2.4 (as shown in the lower right corner of Fig. 3) over the circuit: ground, contact e9, contact R223 of relay 22, rest contacts of bank X2b of rotary switch X2, contact and winding of rotary switch X2, negative battery. Rotary switch X2 returns to its rest position through the sector b.

The position 9 is passed by: ground, rest contacts of bank X1b of rotary switch X1, contact f9, and so on.

The sending of the negative wire impulse over the wire B producing the release of the subscriber's station and the passage from the position 10, takes place as has been above described.

The embodiments which have been above described, have been given by way of example, and certain parts described, or groups of parts, could be replaced by other elements giving the same result, or all such elements or parts of them could be combined with different embodiments without departing from the scope of the present invention.

It will be apparent to those skilled in the art that my invention is susceptible of modifications to adapt the same to particular operating conditions, and all such modifications which are within the scope of the appended claims I consider to be comprehended within the spirit of my invention.

I claim:

1. In a party line telephone system: a central exchange; a subscriber's station; a line comprising a first and a second wire for connecting said exchange to said station; in said station: a switch comprising an actuating electro-magnet, a first and a second row of contact studs, a first brush and a second brush capable of simultaneously hunting over said two rows respectively, each of said two rows comprising a homing position, the homing position of said second row being grounded and the other contact studs of said second row being strapped; a connection between said first brush and said second wire; a connection between said second brush and said first wire through the winding of said electromagnet and a rectifying cell; a connection between the homing contact stud of said first row of contact studs and a ground through a rectifying cell and a make contact; means for closing said contact and holding it in closed position; in said central exchange: a starting relay whose winding is connected at one end to said second wire and at its other end to a battery terminal and means operated by said starting relay for applying the other battery terminal to said first wire; both cells being so oriented as to allow the passage of current therethrough.

2. A party line telephone system according to claim 1 in which said subscriber's station comprises: a connection between one contact stud of said first row of terminals and a ground through a resistance, a rectifying cell and a contact which is closed at the same time as said first mentioned contact; a connection relay, one of the two members of a back contact of said connection relay mounted in said connection, a connection between the other member of said back contact and a ground through the winding of said connection relay and a rectifying cell; said central exchange comprises battery-reversing means; said two rectifying cells being so oriented as to allow the passage of current therethrough after said battery-reversing means have been operated.

3. A party line telephone system according to claim 2, in which said connection relay comprises contacts for connecting said two wires to the subscriber's receiver when said contacts are in front position.

4. A party line telephone system according to claim 2, in which the operation of said connection relay causes the opening of said contact first mentioned in claim 1.

5. In a party line telephone system: a central exchange; a subscriber's station; a line comprising a first and a second wire for connecting said exchange to said station; in said station: a switch comprising an actuating electro-magnet, a first and a second row of contact studs, a first brush and a second brush capable of simultaneously hunting over said two rows respectively, each of said two rows comprising a homing position, the homing position of said second row being grounded, and the other contact studs of said second row being strapped; a connection between said first brush and said second wire; a connection between said second brush and said first wire through the winding of said electro-magnet and a rectifying cell; a connection between a contact stud of said first row and a ground through a connection relay, a back contact of said relay and a rectifying cell, said connection relay comprising two contacts for connecting said two wires to the subscriber's receiver when said two contacts are in front position and said rectifying cell being so oriented as to allow the passage of current therethrough.

HENRI LOUIS LESIGNE.

REFERENCES CITED

The following references are of record in the file of this patent:

UNITED STATES PATENTS

| Number | Name | Date |
|---|---|---|
| 984,204 | Erickson | Feb. 14, 1911 |
| 1,000,077 | Cummings et al. | Aug. 8, 1911 |
| 1,067,274 | Richey | July 15, 1913 |
| 1,206,761 | Hastings | Nov. 28, 1916 |
| 1,457,338 | Burrows et al. | June 5, 1923 |
| 1,896,315 | Kapp | Feb. 7, 1933 |
| 2,013,354 | Lomax | Sept. 3, 1935 |

Certificate of Correction

Patent No. 2,540,896 February 6, 1951

HENRI LOUIS LESIGNE

It is hereby certified that error appears in the above numbered patent requiring correction as follows:

In the grant, line 14, strike out "OF SEVENTEEN YEARS"; same line, after "GRANT" insert *until July 1, 1962*; and in the heading to the printed specification, between line 7 and line 8, insert the following: *Section 1, Public Law 690, August 8, 1946. Patent expires July 1, 1962*;

and that the said Letters Patent should be read as corrected above, so that the same may conform to the record of the case in the Patent Office.

This certificate supersedes Certificate of Correction issued June 26, 1951.

Signed and sealed this 11th day of September, A. D. 1951.

[SEAL]

THOMAS F. MURPHY,
*Assistant Commissioner of Patents.*